United States Patent [19]

Sinclair et al.

[11] Patent Number: 4,695,125

[45] Date of Patent: Sep. 22, 1987

[54] HERMETIC OPTICAL ATTENUATOR

[75] Inventors: William J. Sinclair, Kanata; Tibor F. I. Kovats; Jozef Straus, both of Ottawa, all of Canada

[73] Assignee: Northern Telecom Limited, Montreal, Canada

[21] Appl. No.: 233,500

[22] Filed: Feb. 11, 1981

[51] Int. Cl.⁴ .......................... G02B 6/36; G02B 7/26
[52] U.S. Cl. ............................. 350/96.20; 350/96.21
[58] Field of Search ..................... 350/96.20, 96.21

[56] References Cited

U.S. PATENT DOCUMENTS

| 4,186,996 | 2/1980 | Bowen et al. | 350/96.20 |
| 4,330,171 | 5/1982 | Malsot et al. | 350/96.20 |

Primary Examiner—William L. Sikes
Assistant Examiner—Robert E. Wise
Attorney, Agent, or Firm—S. L. Wilkinson; J. E. Mowle

[57] ABSTRACT

A passive fiber optic device and optical fiber connected to it are packaged in a solid block of a bismuth containing fusible alloy. The alloy exhibits appreciable expansion on solidification, negligible dimensional change after solidification, and a low thermal expansion coefficient. Coupled with its low melting point and glass wetting ability, the alloy is uniquely adapted for forming a hermetic seal with glass. By molding as a solid block, the packaging operation is rendered simple and rapid.

7 Claims, 2 Drawing Figures

HERMETIC OPTICAL ATTENUATOR

This invention relates to a hermetic fiber optic package and to a method of producing such packages.

Hermetic seals are necessary in fiber optic insulations in order to combat the adverse effects, (fluctuating performance and reduced lifetime), of moisture and gaseous contaminants on active devices such as semiconductor lasers and photodiodes and passive devices such as attenuators.

In our copending application (U.S. patent application Ser. No. 061,501, filed July 26, 1979 now abandoned), we describe a hermetic feedthrough for a fiber optic device package which is fabricated by placing an optical fiber end part, bared of its protective jacket, along the central axis of a tube and injecting a fusible alloy through a port in the tube wall to solidfy in the space between the fiber and the wall. The tube is then soldered into a bore through a wall of an open-topped package housing and the fiber end and particular electro-optic device are manipulated and fixed into a working position. Finally a top is hermetically sealed onto the housing, typically made of brass, to seal the device therein. The preferred fusible alloy used in the hermetic seal was a bismuth-containing alloy characterized particularly by appreciable expansion on solidification, a low thermal coefficient of expansion, and minimum relaxation after solidification. Other advantageous properties of the preferred bismuth-containing alloy were its tendency to wet glass and its low melting point.

In making a fiber optic device package of this type, four basic steps are needed: one or more glass-to-tube hermetic feedthroughs are made; the tube(s) are soldered into package bores; the fiber(s) and device are relatively manipulated and then fixed in position; and finally, the package is closed. The number of steps involved make this a relatively time consuming operation.

A fiber optic package design is now proposed which, while utilizing the unique combination of properties of bismuth-containing fusible alloys provides a packaging operation which is extremely rapid.

According to one aspect of the invention in a hermetic package for a fiber optic device having at least one optical fiber connected thereto, said device and the bared outer surface of an end portion of the fiber connected to the device have molded therearound a block of a bismuth-containing fusible alloy characterized by appreciated expansion on solidfication, minimal dimensional change after solidification, and a low thermal expansion coefficient.

The fusible alloy preferably exhibits expansion on solidification of at least 0.2%, a coefficient of thermal expansion less $0.40 \times 10^{-4}$ per °C. and a dimensional change after solidification no greater than 0.05%. In the package, the fusible alloy block preferably extends around both said bared portion of the fiber or fibers and a jacketed portion of the fiber immediately adjacent the bared portion. A preferred example of fusible alloy having the properties defined above is one containing 40% bismuth, 60% tin.

If the device has exposed conducting portions the device is preferably encased in a mass of epoxy to insulate the device from the conducting fusible alloy. The fusible alloy block preferably has a central portion surrounding the device and extending from it projecting portions embracing the or each fiber and any sheathed conductors extending from the device.

An embodiment of the invention will now be described by way of example with reference to the accompanying drawings, in which.

Figure 1:
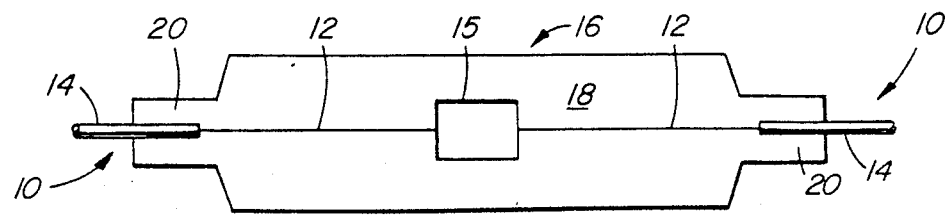
FIG. 1 is a longitudinal sectional view of a package according to the invention.

Referring in detail to FIG. 1, there is shown a pair of optical fibers 10 having end portions 12 stripped of protective jacketing 14. The fiber ends portions form part of an attenuator 15 which is produced by coating the flat end of one of the fiber end portions 12 with a partly transparent coating of chromium using vapour deposition, butting the flat end of the other fiber against the first fiber end, and encasing the junction in an epoxy adhesive. A block 16 of Cerrocast (Registered Trade Mark) is then molded around the attenuator 15 and the fibers 10 extending from it. The casting 16 comprises a central rectangular section 18 around the device 15 and reduced portions 20 which embrace part of the jacketed portions 14.

Figure 2:
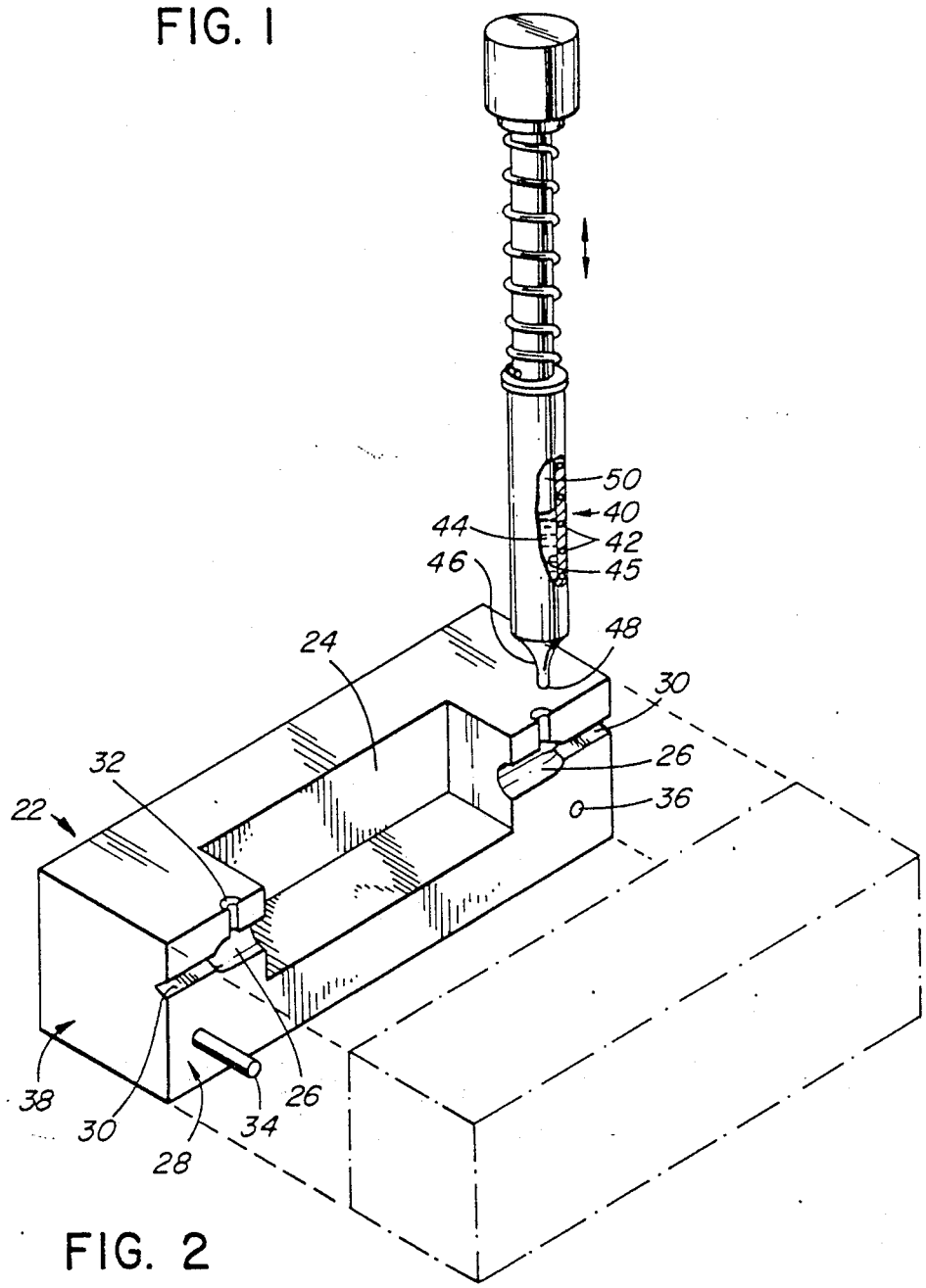
FIG. 2 is a perspective view of one part of a two-part mold for casting the package of FIG. 1.

The casting is performed using a two-part mold, one of the parts 22 being shown in bold line in FIG. 2, the other part being shown in phantom. The mold part 22 is a stainless steel cuboid having a cuboid recess 24. At each end of the recess 24 a semicircular section channel 26 extending into a junction face 28 links the recess 24 to V-section grooves 30. Bell-mouthed ports 32 provide a means for injecting molten fusible alloy. It will be understood that the two parts 22 of the mold are symmetrical so that when the parts are put together with a guide pin 34 on one part locating in a guide hole 36 in the outer part, the molding cavity shape produced has a rectangular well in a top surface, a cylindrical bore extending from each end of the well, and a narrow square section passage extending from the outer ends of the cylindrical recesses to respective ends 38 of the mold.

In operation, to make the attenuator, the silicone or other protective jacket of a pair of fiber ends is stripped using solvent, or heat, or mechanical force. One fiber end is coated with a uniform attenuating layer and the two fiber ends aligned in a V-groove before being subsequently spliced together. Alternatively, a small mass of epoxy adhesive is applied at the junction region to affix the two fiber ends together.

The attenuator and adjacent lengths of the fibers are then let into the V-grooves 30 in one of the mold parts, the attenuator 15 being suspended in the recess 24. The two mold parts are then joined together with the aid of guiding pins and holes respectively 34 and 36. The outer silicone jacket 14 of the fiber is slightly resilient so tends slightly to deform and fill the square section passages formed by opposed V-grooves 30.

A bismuth-containing fusible alloy is then introduced into the mold chamber. The preferred alloy, Cerrocast(RTM), is characterized by a low coefficient of thermal expansion, minimal relaxation after solidification and by the property of expanding during the period of solidification. Cerrocast, which is an alloy of tin (60%) and bismuth (40%), has a coefficient of thermal expansion of 0.000015/°C., a linear shrinkage after solidification of about 0.01% and linear growth during solidification of 0.5%. Other bismuth containing alloy materials which have the above properties, which also wet glass and have a low melting point as Cerrocast does can be easily determined by those familiar with the art. Wetting of the glass and lowering of the alloy melting point can be achieved by adding indium to the alloy.

The molten alloy is injected through injection ports 32 from a thermally controlled syringe 40 reciprocally mounted above each of the ports 32. The syringe 40 incorporates a heater element 42 around a cylinder 45 filled with injectant alloy 44. A hollow needle 46 has its end formed with a conical rim 48 in order that, when the needle end is pressed against the mold, the needle end and the broadened end of the port 32 form a seal preventing escape of injected alloy 44. The alloy 44 is heated by element 42 until it is at a temperature at which it shows the desired flow properties and is then ejected down the needle by means of a reciprocal piston 50. Molten alloy passes through the ports 32 and into the cylindrical recesses 26 and chamber 24. The alloy is prevented from sprewing from passages 30 by the jacketed parts of the optical fibers. Alloy is injected until the chamber is filled and then allowed to solidfy by cooling. At this time the alloy and the bared fibers 12 are subjected to a small pressure increase owing to the alloy expanding within the chamber 24.

A slight excess of pressure is desirable since it enhances the hermetic seal at the glass-alloy interface and discourages crack formation of the glass. Moreover, since the alloy has negligible shrinkage and low thermal coefficient of expansion after solidification, the pressure exerted by it is substantially invariable which aids reproducibility of optical performance of bared fiber length within the molded material.

The fusible alloy cools first at the exposed surface of the mold thereby, in effect, producing a totally enclosed chamber for solidification of the rest of the alloy. A chamber which is relatively large compared with the dimensions of the device being packaged is used in order that the solidifying alloy, as it expands can fill small voids at the periphery of the chamber and yet still undergo sufficient additional expansion to provide wetting and a pressure contact at the junction of the alloy with the bared fibers.

It will be seen from FIG. 1, that the fibers where they exit the alloy molding are jacketed. Together with a rudimentary flexibility permitted by the spur sections 20 of the molding, this allows the fibers to be flexed relative the molding without over-stressing the fiber at the point where it enters the molding.

Although the embodiment shown is for an attenuator device, it will be appreciated that the technique can be applied to packaging other passive fiber optic components which have an input and/or output fiber. Example are multiplexers, demultiplexers and optical filters.

What is claimed is:

1. A hermetically packaged passive fiber optic device, the device having at least one optical fiber connected thereto, the device and an outer surface of a bared portion of said at least one fiber having molded therearound a single block of a bismuth-containing fusible alloy characterized by an expansion during solidification of at least 0.2%.

2. A hermetic package as claimed in claim 1, in which the fusible alloy contains between 30 and 50% bismuth and between 70 and 50% tin.

3. A hermetic package as claimed in claim 1, in which the alloy has a coefficient of thermal expansion less than 0.00002/°C.

4. A hermetic package as claimed in claim 1, in which the fusible alloy exhibits a dimensional change after solidification no greater than 0.5%.

5. A hermetic package as claimed in claim 1, in which the fusible alloy block embraces both said bared portion of the fiber and a jacketed portion of the fiber immediately adjacent the bared portion.

6. A hermetic package as claimed in claim 5, in which said fusible alloy block has a relatively large section body portion embracing both the fiber optic device and one part of said bared portion, a relatively narrow spur portion projecting from said body portion, and embracing a junction between the jacketed portion and the bare portion of the optical fiber.

7. A hermetic package as claimed in claim 1 in which the fiber optic device is encased within a mass of electrically insulating material and said fusible alloy block is molded around the encased device.

* * * * *